US006845672B2

(12) United States Patent
Mol et al.

(10) Patent No.: US 6,845,672 B2
(45) Date of Patent: Jan. 25, 2005

(54) SENSOR ASSEMBLY AND SENSOR SYSTEM FOR COMBINED BEARING LOAD SENSING AND BEARING HEALTH MONITORING

(75) Inventors: Hendrik Anne Mol, Sleeuwijk (NL); Simon Van Ballegooij, Wijk Bij Duurstede (NL)

(73) Assignee: AB SKF, Gothenburg (NL)

( * ) Notice: Subject to any disclaimer, the term of this patent is extended or adjusted under 35 U.S.C. 154(b) by 0 days.

(21) Appl. No.: 10/476,455

(22) PCT Filed: May 1, 2002

(86) PCT No.: PCT/NL02/00285
§ 371 (c)(1),
(2), (4) Date: Dec. 1, 2003

(87) PCT Pub. No.: WO02/088653
PCT Pub. Date: Nov. 7, 2002

(65) Prior Publication Data
US 2004/0118209 A1 Jun. 24, 2004

(30) Foreign Application Priority Data
May 1, 2001 (NL) .............................................. 1017977

(51) Int. Cl.[7] ........................ G01M 13/02; G01N 29/00
(52) U.S. Cl. ........................................... 73/593; 73/659
(58) Field of Search ............................ 73/587, 593, 659, 73/660

(56) References Cited

U.S. PATENT DOCUMENTS

| | | | | |
|---|---|---|---|---|
| 3,375,707 A | * | 4/1968 | Neitz | 73/658 |
| 3,952,566 A | * | 4/1976 | Jacobson | 73/10 |
| 4,237,454 A | * | 12/1980 | Meyer | 340/682 |
| 5,140,849 A | * | 8/1992 | Fujita et al. | 73/593 |
| 5,677,488 A | | 10/1997 | Monahan et al. | 73/593 |
| 5,703,295 A | * | 12/1997 | Ishida et al. | 73/593 |
| 6,484,582 B2 | * | 11/2002 | Ehrfeld et al. | 73/593 |
| 6,571,632 B1 | * | 6/2003 | Browner et al. | 73/593 |

FOREIGN PATENT DOCUMENTS

| | | |
|---|---|---|
| DE | 42 18 949 A1 | 12/1993 |
| EP | 0 637 734 A1 | 2/1995 |

* cited by examiner

*Primary Examiner*—Hezron Williams
*Assistant Examiner*—Rose M. Miller
(74) *Attorney, Agent, or Firm*—Oliff & Berridge, PLC

(57) ABSTRACT

Sensor assembly for measuring a load on a bearing having at least one bearing ring (11), the at least one bearing being provided with a cavity (12) for holding the sensor assembly. The sensor assembly comprises a series mounting between opposing sides (17, 18) of the cavity (12), the series mounting comprising a piezoelectric plate (16) and a spring (19) with spring stiffness k. Alternatively, the sensor assembly further comprises a body (14) with mass in mounted between the piezoelectric plate (16) and the spring (13), to allow simultaneous load measurement and health monitoring.

6 Claims, 2 Drawing Sheets

SENSOR ASSEMBLY AND SENSOR SYSTEM FOR COMBINED BEARING LOAD SENSING AND BEARING HEALTH MONITORING

The present invention relates to a sensor assembly and a sensor system for combined bearing load sensing and bearing health monitoring. More specifically, the present invention relates to a sensor system for measuring a load on a bearing having at least one bearing ring, the at least one bearing being provided with a cavity for holding the sensor assembly, the sensor assembly comprising a series mounting between opposing sides of the cavity, the series mounting comprising a piezoelectric plate and a spring with spring stiffness k.

American patent U.S. Pat. No. 5,677,488 describes a sensor for monitoring the behaviour of a bearing using a piezoelectric film transducer in a contiguous pressure wave responsive communication with the bearing. The sensor system may also be used to determine the rotational speed of the bearing. Imminent failure of the bearing is determined by comparing the signal from the piezoelectric transducer with a set threshold or by comparing signals from a number of piezoelectric transducers to cancel out common mode noise.

Furthermore, sensor assemblies of the type defined in the preamble are known for measuring the load on a bearing indirectly, i.e. by measuring the structural deformation of a bearing ring.

However, none of the known systems can be used to simultaneously determine the load on a bearing and the health of a bearing.

The present invention tries to provide a sensor for providing both information on the load on a bearing and information on the health of a bearing.

For this, the present invention, in a first aspect, provides a sensor system, in which the sensor assembly further comprises a body with mass m mounted between the piezoelectric plate and the spring.

The present invention provides the advantage over known sensors in that two different bearing parameters, i.e. the bearing's load force and the regularly excited vibrations related to bearing health can be measured during operation of the bearing.

In an embodiment of the sensory system according to the present invention, an electrical insulating plate is positioned between the piezoelectric plate and the body. The charge on the piezoelectric plate can then be measured between the opposing surfaces of the piezoelectric plate.

Preferably, the sensor system is positioned substantially perpendicular to a bearing axis. This allows effective measurement of (load induced) displacements of the first surface and (bearing defect) induced acceleration or vibration of the bearing ring.

In a preferred embodiment, the cavity is provided in at least one bearing ring. This may be the bearing inner ring or bearing outer ring. Alternatively, the cavity is provided in at least one roller body of the bearing. The roller bodies present in a roller bearing between inner and outer ring are also subjected to the forces exerted on the bearing, and thus provide an alternative position for providing the cavity for the sensor assembly.

The present sensor system can effectively measure two different bearing parameters during operation of the bearing, using only a single sensor assembly.

Preferably, the processing means are further arranged to determine the bearing health from the measurement signal representing the acceleration of the bearing. Vibrations and accelerations of the bearing as measured by means of the higher frequency component of the charge signal from the piezoelectric sensor provide an indication of the bearing health.

The present invention will be explained in further detail by describing an exemplary embodiment of the present invention, with reference to the accompanying drawings, in which.

Figure 1:
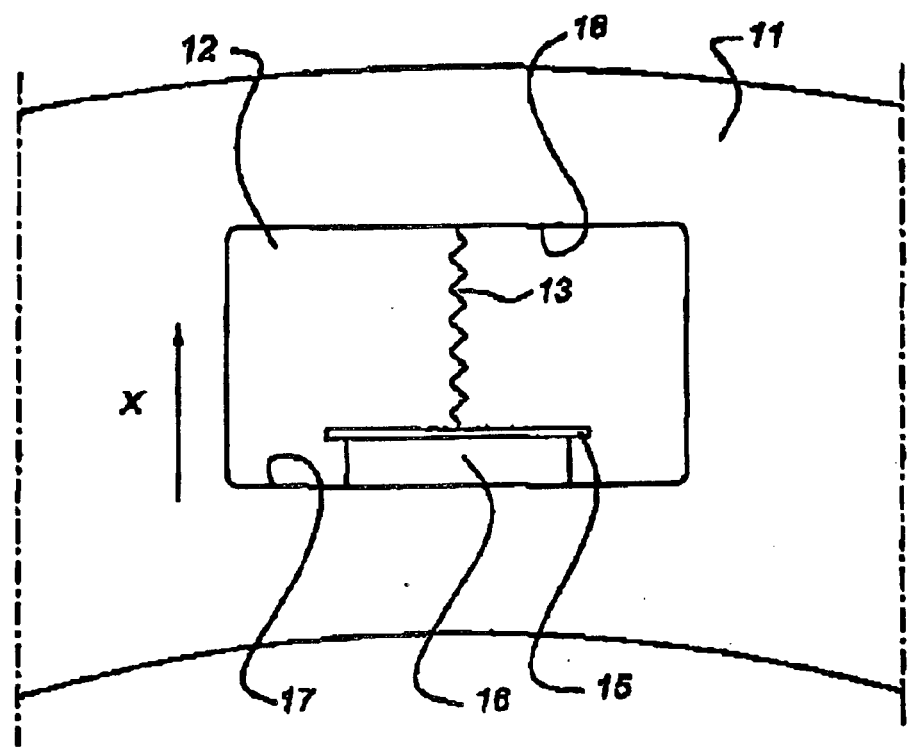
FIG. 1 shows a cross sectional view of a sensor assembly according to a first embodiment of the present invention.

In FIG. 1, a bearing ring 11 provided with an exemplary embodiment of a sensor assembly according to the present invention is shown. In the bearing ring 11, which is shown as being a bearing outer ring, but may also be a bearing inner ring, a cavity 12 is provided having a first surface 20 substantially parallel to the inside surface or raceway of the bearing ring 11 and a second surface 21 substantially parallel to the first surface 20. The cavity 12 may be square, but is preferably round when viewed in the direction of the bearing axis, which allows well known milling methods to provide the cavity 12 in the bearing ring 11. In the cavity 12, a series mounting of a spring 13 with spring stiffness k an isolating plate 15, and a piezoelectric 16 is mounted between the first and second surface 17, 18. This way, the sensitivity of the sensor assembly is directed towards a bearing axis, allowing effective measurement of (radial) loads on the bearing. The piezoelectric plate 16 may be commercially available piezoelectric material, having a 5 mm×5 mm dimension and a thickness of 0.4 mm. To enhance the mechanical rigidity, the piezoelectric plate 16 may be sandwiched between protective plates (not shown).

The spring 13 may be a simple screw spring, but may also be embodied as a blade spring. The cavity 12 may be adapted to the firm of the spring 13, in order to ascertain that the spring 13 exerts a force perpendicular to the piezoelectric plate 16.

When a load is being applied on the bearing ring 11 (and thus on the bearing), the first and second surfaces 17, 18 of the cavity 12 will be brought closer to each other, because of the elastic properties of the material of the bearing ring 11. In general, it can be said that the displacement in the X-direction (see FIG. 1) is proportional to the structural deformation due to the bearing load. In static conditions, the spring 13 will then exert a force on the piezoelectric plate 16 which is proportional to the displacement times the spring stiffness k. The piezoelectric plate 16 will thus generate a charge Q which is proportional to the force on the piezoelectric plate 16, and thus also proportional to the load on the bearing ring 11. The charge Q on the piezoelectric plate 16 may be sensed between the top and bottom surface of the piezoelectric plate 16.

Figure 2:
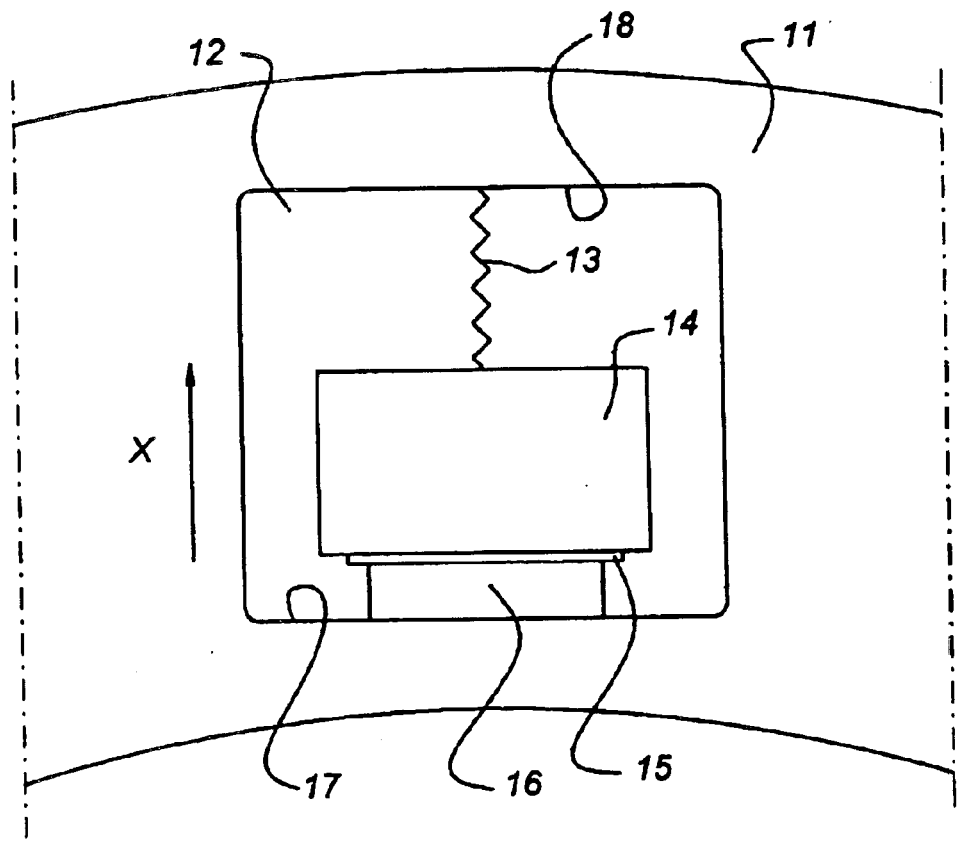
FIG. 2 shows a cross sectional view of a sensor assembly according to a further embodiment of the present invention.

FIG. 2 shows a further embodiment of the present invention which also allows simultaneous measurement of vibrations or acceleration. These vibrations may be induced by failures in the bearing raceway or other roller bearing elements, enabling health monitoring of the bearing. For this, a body 14 with mass m is included in the series mounting of the spring 13, and piezoelectric plate 16.

As the material of the bearing ring 11 is usually a metal, an isolating plate 15 on at least one side of the piezoelectric plate 16 is necessary to sense the charge Q. In that case, the charge Q of the piezoelectric plate 16 may be sensed using leads to the isolated surface of the piezoelectric plate 16 and to the bearing ring 11. Optionally, the body 14 with mass M is made of an electrically isolating material. In that case, the isolating plate 15 may be dispensed with, as the charge Q on the piezoelectric plate 16 can now be measured directly between the bottom and top surface of the piezoelectric plate 16.

When the body 14 with mass M is present, the above will only be valid for the low frequency component of the charge signal. The assembly of spring 13, body 14 and piezoelectric plate 16 will act as a mechanical filter, having a cut-off frequency $f_0$ equal to $\frac{1}{2}\pi\sqrt{(k/m)}$. Below the cut-off frequency $f_0$, the charge Q is proportional to the displacement and thus to the load on the bearing ring 11. Above the cut-off-frequency, the charge Q is proportional to the acceleration of the ring 11: due to the mass inertia, above the cut-off frequency, the body 14 will be substantially stationary in space, and thus the piezoelectric plate 16 will be extracted and contracted substantially proportional to the displacement induced by the acceleration of the first surface 17. The acceleration of the bearing 11 may provide information on regularly exited vibrations in the bearing related to the bearing health. The cut-off frequency $f_0$ may be designed to match required characteristics of the sensor assembly.

Figure 3:
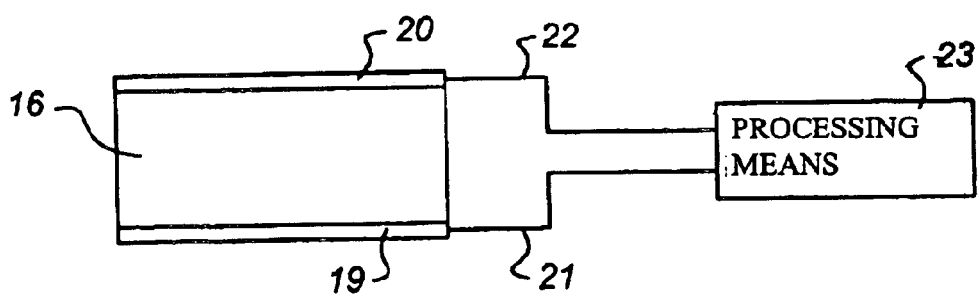
FIG. 3 shows a schematic diagram of a sensor system according to the present invention.

FIG. 3 shows a schematic diagram of a sensor system according to an embodiment of the present invention. The sensor system comprises a sensor assembly according to the present invention, of which only the piezoelectric plate 16 is shown in FIG. 3. Two electrical contacts 19, 20 are used to sense the charge Q on the piezoelectric plate 16, and are connected to two signal leads 21, 22, respectively, which are also connected to processing means 23. A first one of the electrical contacts 19 may be provided by the (metallic) bearing ring 11 which is in electrical contact with piezoelectric plate 16. The second electrical contact 20 may then be provided between the piezoelectric plate 16 and the isolating plate 15.

The processing means 23 are arranged to measure two different parameters relating to the bearing from the charge signal from the piezoelectric plate 16. The charge signal component above the mechanical cut-off frequency $f_0$ is a measure for the acceleration of the bearing. From this, further characteristics of the bearing relating to the bearing health may be derived. The charge signal component below the cut-off-frequency is a measure for the displacement of the first surface 17 of the cavity 12, and from this, the load on the bearing ring 11 may be deduced, having regard to the known properties of the material of the bearing ring 11, and the dimensions of the bearing ring 11 and cavity 12.

The processing means 23 may be implemented using analog signal processing components, such as filters, amplifiers etc., or alternatively, may comprise digital processing components, such as a digital processor, or a mix thereof.

As an alternative, the cavity 12 is provided in one of the roller bodies of a roller bearing, which arm positioned between the outer ring 11 and inner ring. These roller bodies are also subject to the forces exerted on the bearing and may provide an alternative location for the sensor assembly. Provisions are then present to relay the measured signals of the sensor assembly to the outside world, e.g. using an RF transmission path (see e.g. European patent application EP-A-0 637 734).

What is claimed is:

1. Sensor system comprising:

at least one sensor assembly for measuring a load on a bearing having at least one bearing ring (11), the at least one sensor assembly comprising a piezoelectric element, characterized in that the at least one bearing ring is provided with a cavity for holding the sensor assembly, the sensor assembly comprising a series mounting between opposing sides of the cavity, the series mounting comprising a piezoelectric plate, a spring with spring stiffness k and a body with mass m mounting between the piezoelectric plate and the spring, the sensor system further comprising processing means connected to the piezoelectric plate for receiving a charge signal representing a charge on the piezoelectric plate, the processing means being arranged to provide a measurement signal representing a load on the bearing from the charge signal below a cut-off frequency and a measurement signal representing the acceleration of the bearing from the charge signal above the cut-off frequency, the cut-off frequency $f_0$ of the sensor device being equal to $\frac{1}{2}\pi\sqrt{(k/m)}$, in which k is the spring stiffness of the spring and m is the mass of the body.

2. Sensor system according to claim 1, in which the processing means are further arranged to determine the bearing health from the measurement signal representing the acceleration of the bearing.

3. Sensor system according to claim 1, in which an electrical insulating plate is positioned on one side of the piezoelectric plate.

4. Sensor system according to claim 1, in which the sensor assembly is positioned substantially perpendicular to a bearing axis.

5. Sensor system according to claim 1, in which the cavity is provided in at least one bearing ring.

6. Sensor system according to claim 1, in which the cavity is provided in at least one roller body of the bearing.

* * * * *